Oct. 12, 1943.　　　　　M. C. SCHWAB　　　　　2,331,736
METHOD OF DETECTING SUBMARINE OBJECTS AND APPARATUS THEREFOR
Filed Sept. 18, 1941　　　　　3 Sheets-Sheet 1
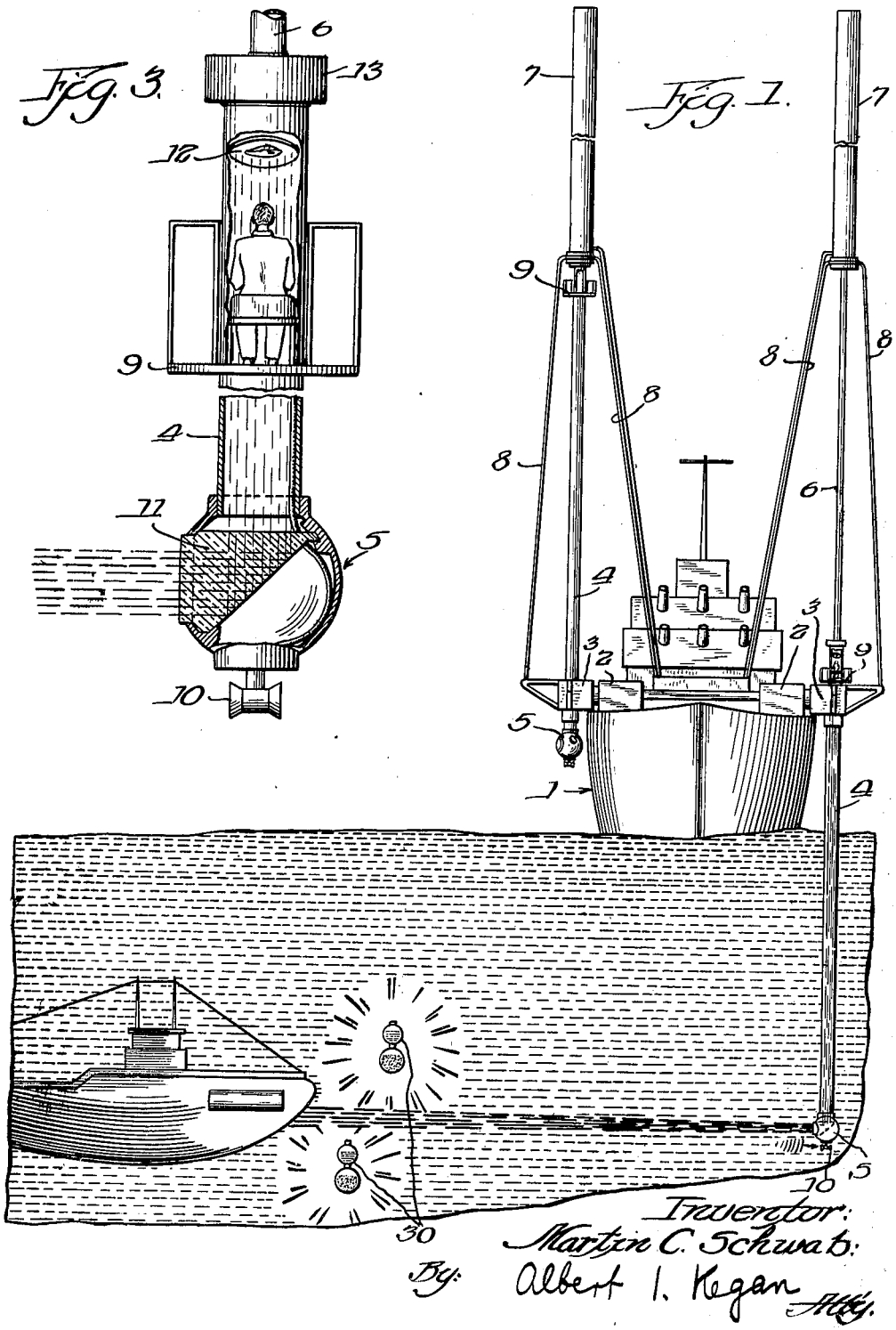

Oct. 12, 1943.   M. C. SCHWAB   2,331,736
METHOD OF DETECTING SUBMARINE OBJECTS AND APPARATUS THEREFOR
Filed Sept. 18, 1941   3 Sheets-Sheet 2
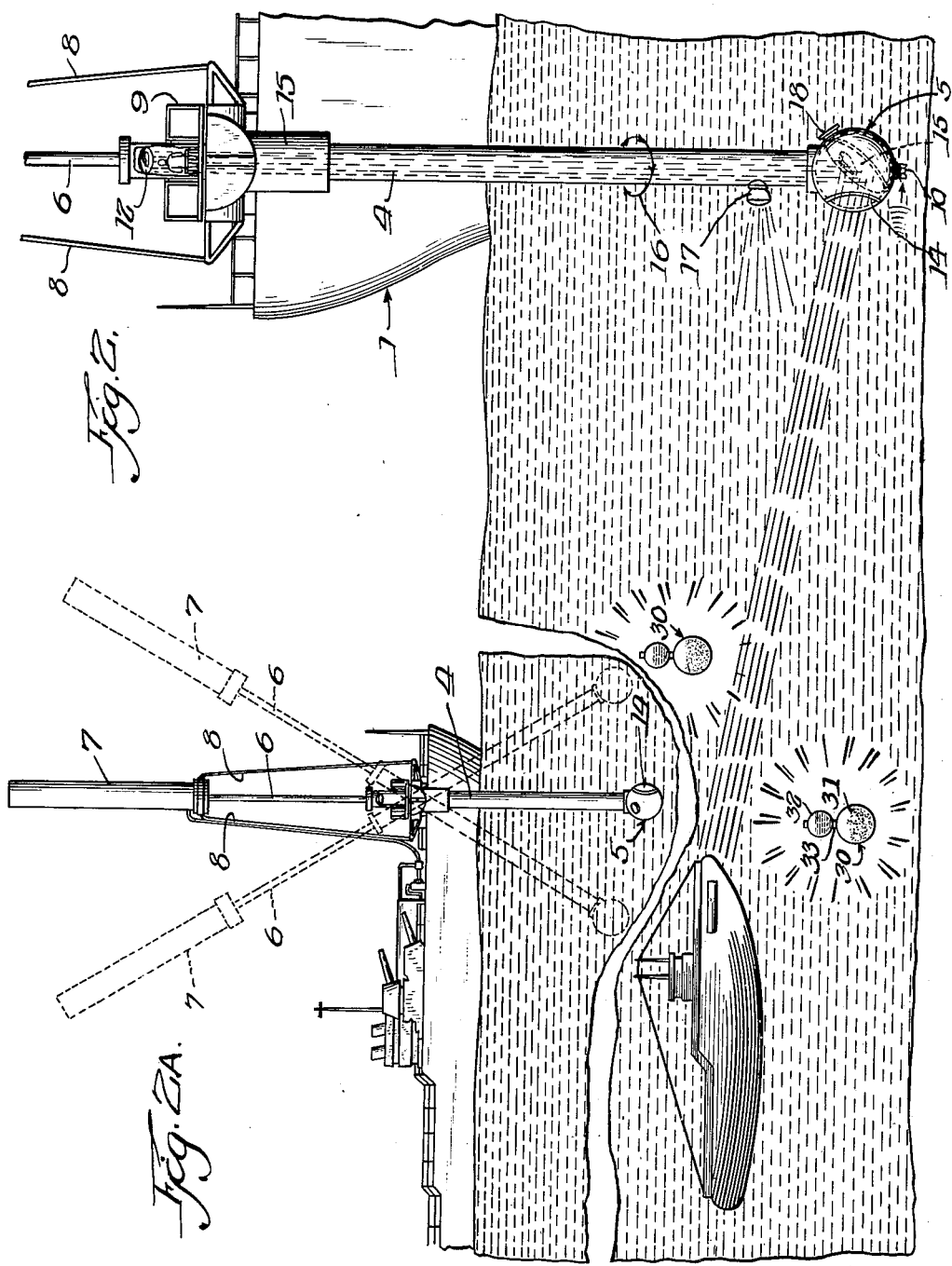

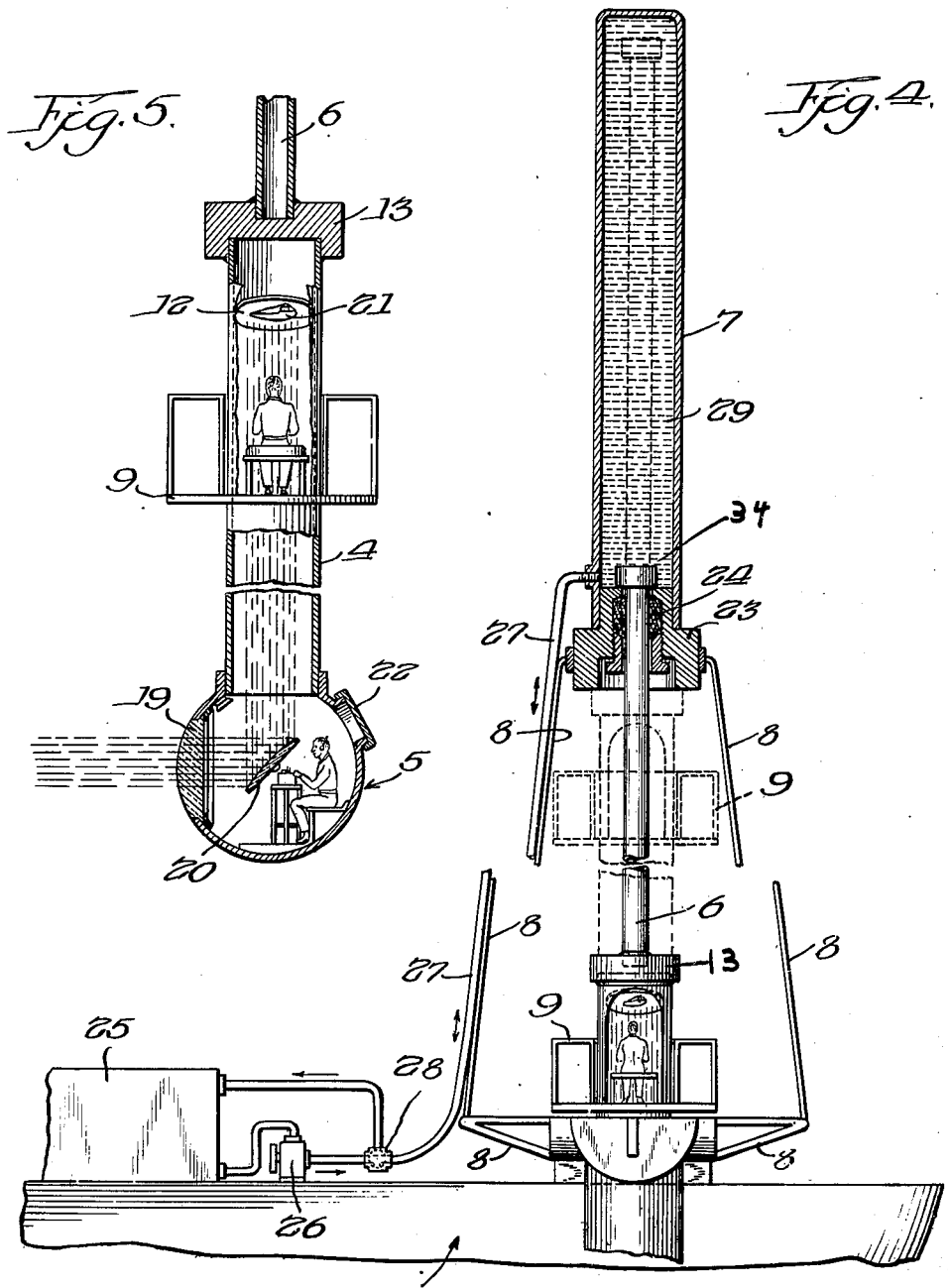

Patented Oct. 12, 1943

2,331,736

UNITED STATES PATENT OFFICE 2,331,736

METHOD OF DETECTING SUBMARINE OBJECTS AND APPARATUS THEREFOR

Martin C. Schwab, Chicago, Ill.

Application September 18, 1941, Serial No. 411,372

1 Claim. (Cl. 88—71)

This invention relates to watercraft, and more particularly to watercraft provided with means for detecting submarine objects. The invention resides in the provision of an improved form of inverted periscope to facilitate scouting under the surface of the sea by an observer located above said surface.

It is a principal object of the present invention to provide a ship or the like having a periscope which may be lowered below the surface of the water, rotated, and/or oscillated to facilitate observation.

Another principal object resides in the provision of a novel method for detecting submarine objects, which comprises illuminating a body of water from below the surface thereof and reflecting the image of an object so illuminated through a suitable lens system to an operator situated above the surface of the water.

A further object is to provide means for lowering a submarine periscope a substantial distance into the sea, and further adapted to control the retraction of the same.

Another object is to provide a diving tube having a chamber within which an observer may operate under atmospheric conditions in direct communication with persons upon a ship.

Other objects are to provide a method and apparatus of maximum simplicity, dependability and ease of use for the purposes herein described.

The foregoing and such other objects, advantages and capabilities as may appear herein or be pointed out as this description proceeds, or as are inherent in the present invention, are illustrated in the accompanying drawings, in which:

Figure 1 is a front elevational view of a ship provided with the scanning apparatus of the present invention, and illustrates diagrammatically the operation of said apparatus.

Figure 2 is a fragmentary view more or less similar to Figure 1, but illustrates a scanning means provided with a mirror reflector.

Figure 2A is a side elevational view of a ship constructed with a modified form of the scanning device of the present invention, and illustrates the manner in which said scanning device may be oscillated.

Figure 3 is a fragmentary detail cross-sectional view of a portion of the detecting device of the present invention.

Figure 4 is a fragmentary somewhat diagrammatic view, partly in vertical central section, of the mechanism for lowering my improved scanning device into the water.

Figure 5 is a fragmentary central vertical sectional view of portions of my improved scanning device.

Like reference characters are used to designate similar parts in the drawings and in the description of the invention which follows.

Referring now more particularly to the drawings, Figure 1 discloses a ship 1 having a pair of scanning devices of the present invention mounted port and starboard on the main deck. Each of said scanning devices comprises a base 2 to which is attached a massive collar 3 which protrudes over the side of the ship. Slidably mounted in said collar 3 is the stem 4 of the periscope. Said stem terminates in a bulbous portion 5, the structure of which hereinafter will be described in greater detail. The periscope stem 4 is fixed to the plunger 6. Said plunger is adapted to be reciprocated in the cylinder 7 as part of an hydraulic jack. The periscope and its motive mechanism are rigidly fastened to the ship by means of suitable supports 8, 8. Fixed to the periscope stem 4 and adapted to move with it is the crow's nest 9. In Figure 1, the port periscope is shown at maximum submersion, while the starboard periscope is illustrated in fully retracted position.

Referring to Figure 3, it will be seen that the bulb 5 is fastened to the end of the tube 4 which comprises the periscope stem. To the bottom of said bulb 5 may be fixed a sound detector 10 or a supersonic or magnetic detector, or all three. It will be understood that this apparatus is suitably connected to actuating, indicating and recording apparatus on the ship, by means of electrical cable or the like carried within the tube 4.

Within the bulb 5 is fixed the prism 11. Within the tube 4 slightly above the crow's nest 9 is placed a mirror 12 so positioned as readily to be visible to an observer stationed in the crow's nest 9 outside said tube. The portions of the tube 4 which the operator in the crow's nest faces is either cut away or else consists of a transparent panel, so that an observer outside said stem may view the image formed on the mirror 12. Above said mirror 12 is the limit stop 13 which prevents the crow's nest 9 from being forced against the housing 7, and thus eliminates this risk of injury to an operator stationed in said crow's nest.

Figure 2 illustrates an alternative construction in which the bulb 5 is provided with a watertight window 14, which preferably is formed in the shape of a lens. Said lens is adapted to focus the image of a distant object upon the mirror 15. Said mirror 15 reflects said image upwardly along the axis of the tube 4 to the observation mirror 12, where said image may be perceived by an operator stationed in the crow's nest 9. The periscope shown in Figure 2 is provided with a suitable turntable 15 whereby the periscope tube may be rotated about its longitudinal axis, as indicated by the arrows 16, in order to scan an arc of 360 degrees. The periscope further may be provided with a searchlight 17 to illuminate the depths of the sea. It will readily be appreciated that said flood light 17 is connected with a suitable source of electrical energy and with suitable controls situated within the ship 1.

The bulb 5 may, if desired, be provided with a suitable cover 18 whereby access to the interior of said bulb may be had for purposes of calibration, adjustment, cleaning, repair and the like.

Figure 5 illustrates yet another modification of the invention in which a portion of the wall of the bulb 5 consists of a transparent lens 19. Within the bulb is mounted an adjustable mirror 20 adapted to reflect an image formed by the lens 19 through the tube 4 and on to the mirror 12. The image 21 of a submarine is depicted, purely by way of illustration, upon said mirror. The bulb illustrated in Figure 5 also is provided with a hatch 22 through which an operator may enter said bulb. From this position of vantage, the operator may adjust the mirror 20 laterally and/or rotationally, and may also communicate with members of the crew on board the ship by means of telephone or otherwise.

Figure 2A illustrates yet another modification of the invention in which the entire periscope may be oscillated about an axis situated within the collar 3 perpendicular to the longitudinal axis of the tube 4. Means for oscillating the scanning device may be combined with means for rotating the same in a single embodiment whereby wellnigh universal adjustability may be obtained.

In all the modifications of the invention above disclosed the bulb 5 and the tube 4 are in communication with the atmosphere above the surface of the sea. Thus an observer may be stationed in the bulb 5 at a great distance below the surface of the sea, and yet work in comfort at ordinary atmospheric pressure. It will be understood, of course, that appropriate means are provided to enable an observer to enter and leave the tube without withdrawing the periscope from below the surface of the sea. Further, said observer may work in comfort while the periscope is being raised or lowered, for the interior of the instrument always is at normal atmospheric pressure, because it always is in communication with the air approximately at sea level. At great depths, the pressure upon the periscope is enormous, for which reason the instrument must be of sturdy, pressure-resistant construction.

The tube 4 and bulb 5 may be provided with linings of insulating material, to minimize condensation of water within the apparatus due to the cooling effect of the sea at great depths. Or the apparatus may be provided with precooled, dehumidified air by any convenient system of ventilation.

The bulbs above described are provided with only one "eye" or light-receiving window. In addition, the present invention contemplates the provision of a plurality of such "eyes," either in the bulb 5 or in the tube 4, or both.

Marine engineers will appreciate that powerful motive means are imperative if a periscope of substantial dimensions is to be submerged, because of the tremendous buoyant force of the displaced water. For this reason, I prefer to employ hydraulic lowering mechanism more or less analogous to a direct acting hydraulic elevator of the plunger type. Figure 4 illustrates a preferred form of mechanism for submerging the periscope. Rigidly fixed to the ship 1 by the supporting structure 8, is the cylinder casing 7. Said casing 7 is closed at its lower end by the bearing 23, through which the piston 6 passes. A packed gland 24 is provided to prevent fluid leakage through the bearing 23. Suitably placed on the deck or in the interior of the ship is the oil tank 25. The pump 26 is adapted to pump oil from said tank through the supply pipe 27 to the interior of the casing 7. Thus the piston 6 may be forced downwardly by means of hydraulic pressure. If desired, an accumulator (not shown) may be inserted in the line to cooperate with the pump 26. When the piston 6 is forced out of the cylinder 7, the stem 4 and bulb 5 are forced below the surface of the water. The limit stop 34 prevents the plunger 6 from being driven completely out of the casing 7.

When the periscope has been submerged to the desired depth, the two way valve 28 may be closed, whereupon the fluid pressure within the casing 7 will balance the buoyant force of the water displaced by the periscope. An important advantage of the present construction is the definiteness thereof. The exact depth, angle of oscillation, and degree of rotation of the bulb 5 is always apparent from the ship, for the present rigid construction eliminates errors due to lag and eddying.

When it is desired to retract the periscope, the valve 28 is turned so as to permit the fluid 29 within the casing 7 to be forced back into the tank 25 as a buoyancy of the submerged periscope forces the plunger 6 into the casing 7. The degree to which the valve 28 is opened controls the rate at which the periscope is withdrawn from the water.

Ordinarily, sunlight will illuminate the sea to a depth of fifty to eighty feet with sufficient intensity to enable my improved periscope to discern objects; even moonlight sometimes provides sufficient illumination. For scouting at great depths, or by night or in foggy weather, the submarine flares 30, 30 illustrated in Figures 1 and 2 may be utilized as a feature of the present invention. Said flares 30, 30 are thrown or mechanically propelled from the ship 1. The flares have a density greater than that of sea water, so that they slowly sink after striking the surface of the water. Thus the interior of the sea at a considerable distance from the ship may be illuminated, and any object in the illuminated area may be detected through the periscope.

Said submarine flares may consist of a translucent, pressure resistant bulb containing an electric light and a storage battery to provide energy for the same. Or said flares may be thrown like a harpoon while remaining connected to the ship by means of an insulated wire, whereby the flares 30 may be energized by dynamos or batteries upon the ship 1. Alternatively, the flares may be chemo-luminescent. For example, the flare may be composed of a lower bulb 31 containing a chemical and an upper bulb 32 containing a second chemical which slowly trickles through the neck 33 and by chemical reaction with the first chemical emits light. For example, the lower envelope may contain powdered magnesium and the upper envelope may contain compressed oxygen, or a chemical source of oxygen, such as potassium chlorate.

By means of an electrical spark passed through the flare either before said flare is thrown overboard or afterward, the mixture may be ignited, and the magnesium will combine with the oxygen without the evolution of gas, whereby intense illumination will be obtained. Or the flare 30 may consist of a transparent envelope containing thermite and suitable means for igniting the same, whereby intense illumination is obtained without the evolution of gaseous products.

Having thus described the constructional details of my invention, the method whereby it may be employed will now be described more fully. When the ship is cruising in safe waters, my underwater periscope ordinarily will be carried out of the water in retracted position. The starboard periscope in Figure 1 is illustrated in this position. When the periscope is retracted, the piston 6 will lie almost completely within the casing 7, as shown by the broken lines in Figure 4. To submerge the periscope, the pump 26 is set in operation and the valve 28 is turned so that oil or other hydraulic fluid 29 is forced into the casing 7, whereby the plunger 6 is forced out of said casing 7, and the tube 4 and bulb 5 are forced below the surface of the sea.

The mirror 12 is fixed with reference to the periscope stem 4, and so is the crow's nest 9. Accordingly, a lookout stationed in the crow's nest 9 is in position to scan the mirror 12 while the periscope is being raised or lowered. When the periscope has been lowered to the desired depth, the valve 28 is closed. Thereafter the periscope may be rotated upon its longitudinal axis in order that an arc of 360° may be scanned. If desired, the crow's nest 9 and the mirror 12 may be fixed against rotation, the rotating portion being joined to the non-rotatable portion at some point well above the surface of the water.

In addition, the periscope may be oscillated as shown in Figure 2A in order to scan the sea at various depths and from various angles. Alternatively, the periscope may be maintained in vertical position by means of a Sperry gyroscope or the like, while the ship is allowed to rock in the swell of the waves.

In order to facilitate observation, the floodlight 17 (Figure 2) may be used, or the submarine flares 30 may be thrown overboard. Once the operator in the crow's nest detects a submarine, whether by its image on the mirror 12 or by the sound of its motors picked up by the sound detector 10, or by supersonic vibrations reflected from the hull of the submarine and picked up by an appropriate detector, it is a simple matter to take the necessary precautions. The operator in the crow's nest may give the range and the submarine may be attacked by means of depth charges, torpedoes or the like; or the ship may embark upon a zigzag course to confuse the enemy.

If the latter tactic is adopted, it ordinarily will be desirable to turn the valve 28 so that the fluid in the well 7 may return to the reservoir 25 and the periscope may be withdrawn from the water in order to eliminate the loss in speed occasioned by the drag of the submerged periscope.

I have illustrated my invention by describing a number of operative embodiments thereof, and have explained the utility of the invention with reference to perceiving and evading enemy submarines. It will be apparent to those skilled in the marine arts, however, that a wide range of further modifications and variations may be made without departing from the scope of my invention, and that the invention may be used not only for military purposes, but for purposes of scientific research, discovery and salvage of sunken ships, and submarine exploration as well.

Having thus described my invention and illustrated its utility, I claim:

Submarine scanning apparatus consisting of a base to be fixed to a ship, a collar fixed to said base, a rigid tube to be lowered through said collar into the water, a bulb sealing the end of said tube, the interior of said bulb communicating with the interior of said tube and the interior of said tube communicating with the atmosphere, a window in said bulb, means in said bulb for transmitting the image of submarine objects through said tube, a mirror in said tube above the water line for reflecting said image to an observer stationed outside said tube, a window in said tube through which said observer may perceive said mirror, a piston fixed to said tube and coaxial therewith, an inverted well fixed relative to said ship and adapted to receive said piston, a fluid-tight bearing surrounding said piston and sealing said well means for forcing hydraulic fluid into said well to force said tube and bulb into the sea, and valve means for retaining said hydraulic fluid in said well to maintain said tube and bulb submerged at a predetermined depth.

MARTIN C. SCHWAB.